United States Patent
Song et al.

(10) Patent No.: US 10,496,229 B2
(45) Date of Patent: Dec. 3, 2019

(54) TOUCH SENSOR AND A DISPLAY DEVICE INCLUDING THE SAME

(71) Applicant: SAMSUNG DISPLAY CO., LTD., Yongin-si, Gyeonggi-Do (KR)

(72) Inventors: A Ram Song, Yongin-si (KR); Hideo Yoshimura, Yongin-si (KR); Hoe Seok Na, Yongin-si (KR); Yong Jin Jee, Yongin-si (KR)

(73) Assignee: SAMSUNG DISPLAY CO., LTD., Yongin-si, Gyeonggi-Do (KR)

(*) Notice: Subject to any disclaimer, the term of this patent is extended or adjusted under 35 U.S.C. 154(b) by 163 days.

(21) Appl. No.: 15/685,357

(22) Filed: Aug. 24, 2017

(65) Prior Publication Data
US 2018/0059824 A1    Mar. 1, 2018

(30) Foreign Application Priority Data
Aug. 29, 2016  (KR) .................. 10-2016-0110147

(51) Int. Cl.
| | | |
|---|---|---|
| *G06F 3/044* | (2006.01) | |
| *G02F 1/1343* | (2006.01) | |
| *G06F 1/3234* | (2019.01) | |
| *G06F 3/041* | (2006.01) | |
| *G02F 1/1333* | (2006.01) | |

(52) U.S. Cl.
CPC ............ *G06F 3/044* (2013.01); *G02F 1/1343* (2013.01); *G06F 1/3262* (2013.01); *G06F 3/0416* (2013.01); *G02F 1/13338* (2013.01); *G06F 2203/04112* (2013.01)

(58) Field of Classification Search
CPC ...... G06F 3/044; G06F 1/3262; G06F 3/0416; G06F 2203/04112; G02F 1/1343; G02F 1/13338
See application file for complete search history.

(56) References Cited

U.S. PATENT DOCUMENTS

| | | | | |
|---|---|---|---|---|
| 5,606,346 | A * | 2/1997 | Kai ..................... | G06F 1/1626 345/173 |
| 8,493,331 | B2 * | 7/2013 | Krah .................... | G06F 3/041 345/173 |
| 8,519,970 | B2 * | 8/2013 | Westhues ............. | G06F 3/044 345/173 |
| 9,189,113 | B2 * | 11/2015 | Yoshimura .......... | G06F 3/0418 |
| 9,285,902 | B1 * | 3/2016 | Kremin ................ | G06F 3/044 |
| 9,501,451 | B2 * | 11/2016 | Miyamoto ........... | G06F 3/0416 |

(Continued)

FOREIGN PATENT DOCUMENTS

JP     2012-118957     6/2012

*Primary Examiner* — Jose R Soto Lopez
(74) *Attorney, Agent, or Firm* — F. Chau & Associates, LLC

(57) ABSTRACT

A touch sensor includes a plurality of driving electrodes, a plurality of sensing electrodes that intersect the plurality of driving electrodes, a driver configured to substantially simultaneously supply driving signals to at least some of the plurality of driving electrodes, a sensing unit configured to detect sensing signals from the plurality of sensing electrodes, and a touch controller configured to control the driver so that the number of driving electrodes to which the driving signals are supplied in a first driving period is different from the number of driving electrodes to which the driving signals are supplied in a second driving period.

14 Claims, 4 Drawing Sheets

(56) References Cited

U.S. PATENT DOCUMENTS

| | | | |
|---|---|---|---|
| 9,886,129 B2* | 2/2018 | Kim | G06F 3/0418 |
| 10,019,103 B2* | 7/2018 | Gupta | G06F 3/0412 |
| 2012/0086651 A1* | 4/2012 | Kwon | G06F 3/016 |
| | | | 345/173 |
| 2012/0092350 A1* | 4/2012 | Ganapathi | G02B 26/0833 |
| | | | 345/501 |
| 2014/0049486 A1* | 2/2014 | Kim | G06F 3/041 |
| | | | 345/173 |
| 2014/0253498 A1* | 9/2014 | Suzuki | G06F 3/044 |
| | | | 345/174 |
| 2014/0320199 A1* | 10/2014 | Trend | G06F 3/044 |
| | | | 327/517 |
| 2015/0029129 A1* | 1/2015 | Trend | G06F 3/044 |
| | | | 345/174 |
| 2015/0062067 A1* | 3/2015 | Hong | G06F 3/046 |
| | | | 345/174 |
| 2015/0082067 A1* | 3/2015 | Kawano | G06F 1/3275 |
| | | | 713/323 |
| 2015/0091587 A1* | 4/2015 | Shepelev | G06F 3/044 |
| | | | 324/658 |
| 2015/0091848 A1* | 4/2015 | Morein | G06F 3/044 |
| | | | 345/174 |
| 2015/0097801 A1* | 4/2015 | Trend | G06F 3/046 |
| | | | 345/174 |
| 2015/0138145 A1* | 5/2015 | Hwang | G06F 3/0418 |
| | | | 345/174 |
| 2016/0124566 A1* | 5/2016 | Kwon | G06F 3/0416 |
| | | | 345/174 |
| 2016/0162084 A1* | 6/2016 | Wang | G06F 3/0412 |
| | | | 345/173 |
| 2016/0179273 A1* | 6/2016 | Lee | G06F 3/0416 |
| | | | 345/174 |
| 2016/0328060 A1* | 11/2016 | Lai | G06F 3/0412 |
| 2016/0349901 A1* | 12/2016 | Li | G06F 3/0416 |
| 2016/0357310 A1* | 12/2016 | Wang | G06F 3/0412 |
| 2017/0003785 A1* | 1/2017 | Berget | G06F 3/0412 |
| 2017/0045974 A1* | 2/2017 | Huang | G06F 3/0412 |
| 2017/0160851 A1* | 6/2017 | Jin | G02F 1/13338 |
| 2017/0206394 A1* | 7/2017 | Chiang | G06K 9/38 |
| 2017/0220185 A1* | 8/2017 | Kurasawa | G02F 1/13306 |
| 2017/0228064 A1* | 8/2017 | Yao | G06F 3/0412 |
| 2017/0228068 A1* | 8/2017 | Pu | G06F 3/044 |
| 2017/0269750 A1* | 9/2017 | Kang | G02F 1/13439 |
| 2017/0277326 A1* | 9/2017 | Cao | H01L 27/1214 |
| 2017/0315655 A1* | 11/2017 | Weinerth | G06F 3/0416 |
| 2017/0329442 A1* | 11/2017 | Wang | G06F 3/044 |
| 2017/0371477 A1* | 12/2017 | Chen | G06F 3/0414 |
| 2018/0107324 A1* | 4/2018 | Ding | G01L 1/16 |
| 2018/0348904 A1* | 12/2018 | Noma | G06F 3/044 |

* cited by examiner

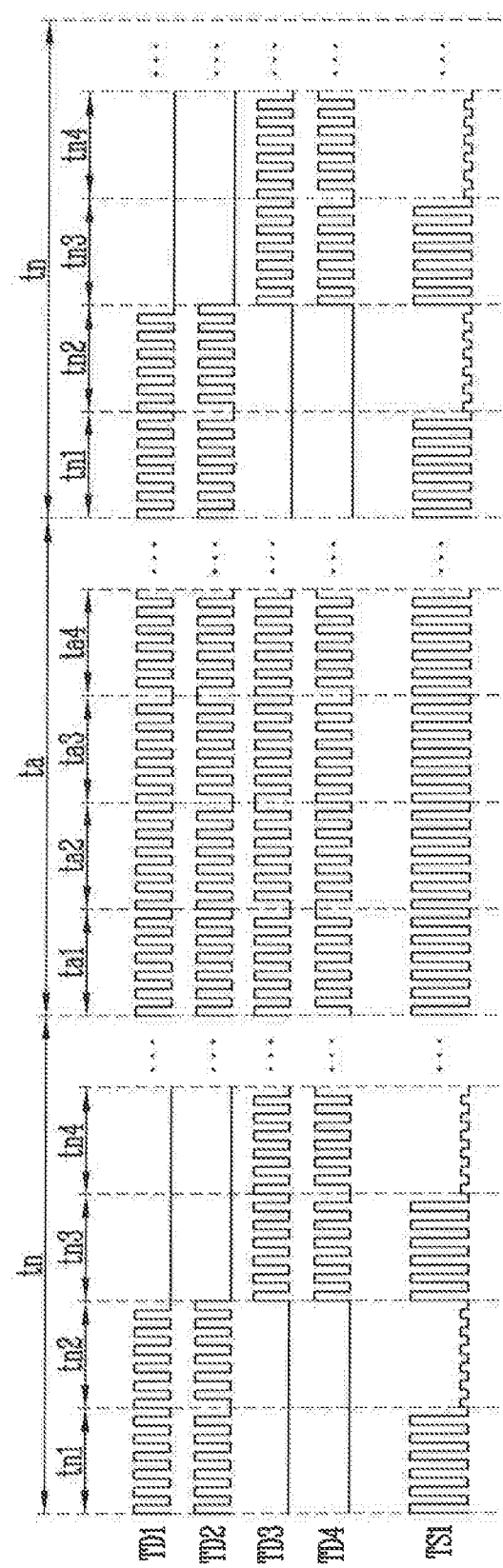

TOUCH SENSOR AND A DISPLAY DEVICE INCLUDING THE SAME

CROSS-REFERENCE TO RELATED APPLICATION

This application claims priority under 35 U.S.C. § 119 to Korean Patent Application No. 10-2016-0110147, filed on Aug. 29, 2016 in the Korean Intellectual Property Office, the disclosure of which is incorporated by reference herein in its entirety.

TECHNICAL FIELD

Exemplary embodiments of the inventive concept relate to a touch sensor and a display device including the same.

DISCUSSION OF RELATED ART

Recently, usage of input devices such as a digitizer or a touch screen, which are capable of replacing conventional input devices such as a keyboard or a mouse by directly detecting positions in which hands or objects contact the input devices, is increasing.

These devices include touch sensors for detecting touch positions. Touch sensors may include, for example, a capacitive touch sensor, a resistive touch sensor, or an optical touch sensor.

A capacitive touch sensor may determine a touch position by detecting a point at which capacitance changes in accordance with contact of a hand or an object. The capacitive touch sensor may easily detect multi-touch with accuracy.

The capacitive touch sensor may include driving electrodes and sensing electrodes. The driving electrodes receive driving signals and the sensing electrodes intersect the driving electrodes and output sensing signals. In a simultaneous driving method, the driving signals may be simultaneously supplied to the driving electrodes.

SUMMARY

According to an exemplary embodiment of the inventive concept, a touch sensor includes a plurality of driving electrodes, a plurality of sensing electrodes that intersect the plurality of driving electrodes, a driver configured to substantially simultaneously supply driving signals to at least some of the plurality of driving electrodes, a sensing unit configured to detect sensing signals from the plurality of sensing electrodes, and a touch controller configured to control the driver so that the number of driving electrodes to which the driving signals are supplied in a first driving period is different from the number of driving electrodes to which the driving signals are supplied in a second driving period.

The number of driving electrodes to which the driving signals are supplied in the second driving period is larger than the number of driving electrodes to which the driving signals are supplied in the first driving period.

The touch controller determines magnitudes of noises from the sensing signals and controls the driver so that the number of driving electrodes to which the driving signals are supplied varies in accordance with the determined magnitudes of the noises.

When the magnitudes of the noises are greater than or equal to a predetermined reference value, the touch controller increases the number of driving electrodes to which the driving signals are supplied.

The first driving period is a normal driving period in which the magnitudes of the noises are smaller than the predetermined reference value and the second driving period is an adaptive driving period in which the magnitudes of the noises are greater than or equal to the predetermined reference value.

The touch controller includes a noise determiner configured to compare electrical characteristic values of the sensing signals with a predetermined reference range and to determine the magnitudes of the noises.

The driver selectively supplies the driving signals, corresponding to predetermined driving codes, to the driving electrodes.

The predetermined driving codes are predetermined by the touch controller.

The plurality of driving electrodes and the plurality of sensing electrodes are formed of a transparent conductive material.

According to an exemplary embodiment of the inventive concept, a display device includes a display unit configured to display an image using image data and a touch sensor that overlaps the display unit. The touch sensor includes a plurality of driving electrodes, a plurality of sensing electrodes that intersect the plurality of driving electrodes, a driver configured to substantially simultaneously supply driving signals to at least some of the plurality of driving electrodes, a sensing unit configured to detect sensing signals from the plurality of sensing electrodes, and a touch controller configured to control the driver so that the number of driving electrodes to which the driving signals are supplied in a first driving period is different from the number of driving electrodes to which the driving signals are supplied in a second driving period.

The display device further includes a data analyzing unit configured to analyze the image data and to determine noise patterns. The touch controller controls the driver so that the number of driving electrodes to which the driving signals are supplied varies in accordance with presence of the noise patterns.

The data analyzing unit compares the image data in units of horizontal lines and determines the image data as the noise patterns when a comparison result is greater than or equal to a reference difference value.

The first driving period is a normal driving period in which the noise patterns are not determined and the second driving period is an adaptive driving period in which the noise patterns are determined.

The display unit includes a plurality of pixels connected to scan lines and data lines. The display device may further include a scan driver configured to supply scan signals through the scan lines, a data driver configured to supply data signals through the data lines, and a timing controller configured to control the scan driver and the data driver.

According to an exemplary embodiment of the inventive concept, in a method of operating a touch sensor including a plurality of driving electrodes and a plurality of sensing electrodes that intersect the plurality of driving electrodes, the method includes detecting sensing signals from the plurality of sensing electrodes, determining magnitudes of noises from the sensing signals, determining whether the magnitudes of noises is less than a predetermined reference value, determining a select number of the plurality of driving electrodes to supply driving signals in response to determining whether the magnitude of noises is less than the predetermined reference value, and supplying the driving signals to the select number of the plurality of driving electrodes at substantially the same time.

The select number of the plurality of driving electrodes when it is determined that the magnitude of noises is less than the predetermined reference value is a first number. The select number of the plurality of driving electrodes when it is determined that the magnitude of noises is greater than or equal to the predetermined reference value is a second number. The first number is less than the second number.

When it is determined that the magnitude of noises is less than the predetermined reference value, a current driving period is set to a normal driving period. When it is determined that the magnitude of noises is greater than or equal to the predetermined reference value, the current driving period is set to an adaptive driving period.

The normal driving period includes first to fourth normal driving periods. The select number of the plurality of driving electrodes is less than a total number of the plurality of driving electrodes. The driving signals are supplied to the select number of the plurality of driving electrodes at substantially the same time during the first and second normal driving periods. The driving signals are supplied to a remaining number of the plurality of driving electrodes at substantially the same time during the third and fourth normal driving periods.

A first sensing signal among the sensing signals has a higher value in the first normal driving period than in the second normal driving period.

Each of the sensing signals has a value corresponding to a sum of the driving signals that are supplied to the select number of the plurality of driving electrodes.

BRIEF DESCRIPTION OF THE DRAWINGS

The above and other features of the inventive concept will be more clearly understood by describing in detail exemplary embodiments thereof with reference to the accompanying drawings.

FIG. 2 is a waveform diagram illustrating an operation of a driver according to an exemplary embodiment of the inventive concept.

DETAILED DESCRIPTION OF THE EMBODIMENTS

Figure 1:
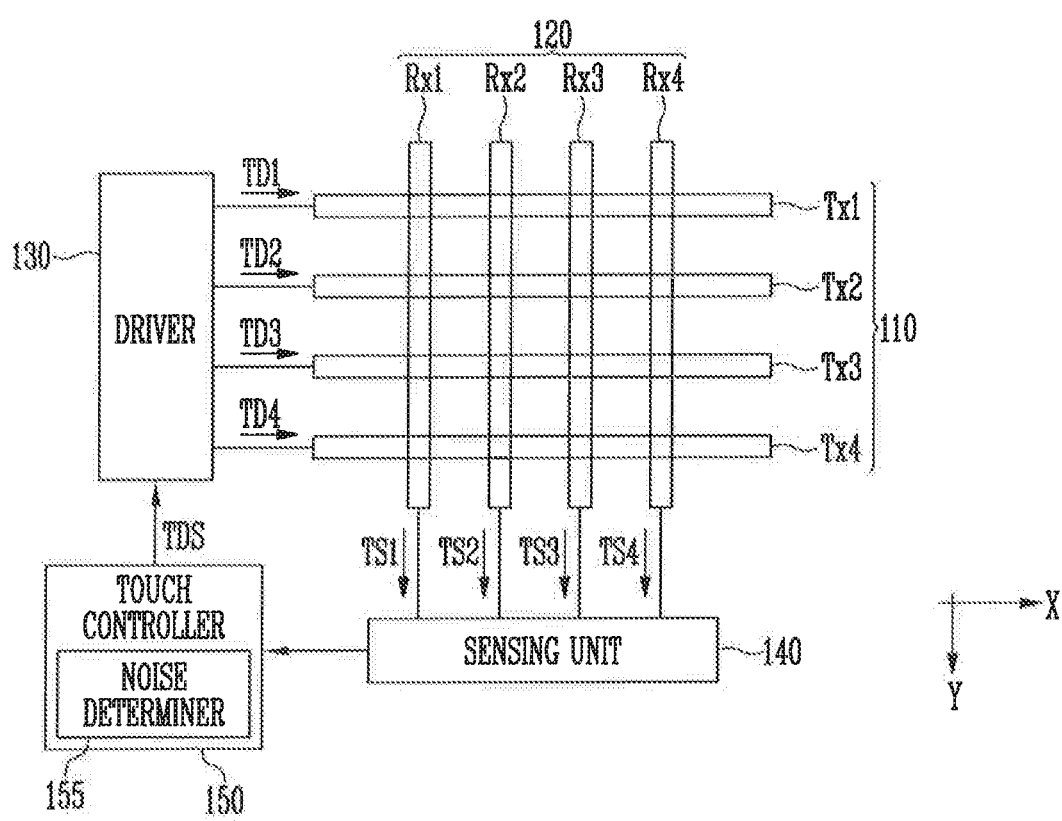
FIG. 1 is a block diagram illustrating a touch sensor according to an exemplary embodiment of the inventive concept.

Exemplary embodiments of the inventive concept will be described more fully hereinafter with reference to the accompanying drawings. Like reference numerals may refer to like elements throughout the accompanying drawings.

In the drawings, dimensions may be exaggerated for clarity of illustration. It will be understood that when an element is referred to as being "between" two elements, it can be the only element between the two elements, or one or more intervening elements may also be present.

While terms such as "first," "second," etc., may be used to describe various components, such components must not be understood as being limited to the above terms. The above terms are used only to distinguish one component from another. For example, a first component may be referred to as a second component without departing from the scope of the inventive concept, and likewise, a second component may be referred to as a first component. As used herein, the singular forms "a", "an", and "the" are intended to include the plural forms as well, unless the context clearly indicates otherwise.

In the present application, it is to be understood that the terms such as "including," "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added. In addition, it will be understood that when an element such as a layer, a film, an area, or a substrate is referred to as being "on" another element, it can be directly on the other element or intervening elements may also be present. Conversely, it will be understood that when an element such as a layer, a film, an area, or a substrate is referred to as being "beneath" another element, it can be directly on the other element or intervening elements may also be present.

FIG. 1 is a block diagram illustrating a touch sensor according to an exemplary embodiment of the inventive concept.

Referring to FIG. 1, the touch sensor according to an exemplary embodiment of the inventive concept includes driving electrodes 110, sensing electrodes 120, a driver 130, a sensing unit 140, and a touch controller 150.

The driving electrodes 110 are longitudinally formed in a first direction (for example, an X axis direction) and may be arranged in a second direction (for example, a Y axis direction) that intersects the first direction.

For example, the driving electrodes 110 may be formed of first through fourth driving electrodes Tx1 through Tx4. According to the present exemplary embodiment, four driving electrodes are illustrated for convenience of description. However, the number of driving electrodes 110 is not limited thereto and may vary.

The sensing electrodes 120 are arranged to intersect the driving electrodes 110 and may function as capacitive touch sensors together with the driving electrodes 110. The sensing electrodes 120 are longitudinally formed in the second direction (for example, the Y axis direction) and may be arranged in the first direction (for example, the X axis direction).

For example, the sensing electrodes 120 may be formed of first through fourth sensing electrodes Rx1 through Rx4. According to the present exemplary embodiment, four sensing electrodes are illustrated for convenience of description. However, the number of sensing electrodes 120 is not limited thereto and may vary.

Due to the above-described arrangement of the driving electrodes 110 and the sensing electrodes 120, mutual capacitance is formed between the driving electrodes 110 and the sensing electrodes 120 that intersect each other, and intersection points at which the mutual capacitance is formed may operate as sensing cells that implement touch recognition.

The driving electrodes 110 and the sensing electrodes 120 may be circular or may have one of various shapes, for example, polygonal shapes such as a rod shape or a diamond shape. Each of the driving electrodes 110 and the sensing electrodes 120 may be formed of a single layer or a multilayer.

The driving electrodes 110 and the sensing electrodes 120 are preferably formed of a transparent conductive material or may be formed of other conductive materials such as an opaque metal.

According to an exemplary embodiment of the inventive concept, the driving electrodes 110 and the sensing electrodes 120 may be formed of a transparent conductive material such as indium tin oxide (ITO), indium zinc oxide (IZO), or antimony zinc oxide (AZO).

According to an exemplary embodiment of the inventive concept, the driving electrodes 110 and the sensing electrodes 120 may be mesh-shaped so that a plurality of conductive lines intersect one another. The driving electrodes 110 and the sensing electrodes 120 may be formed of a conductive metal material or a conductive nano-compound such as a silver nano-wire (AgNW), a carbon nano-tube, or graphene.

The driving electrodes 110 and the sensing electrodes 120 may be positioned on different layers or on the same layer. An insulating layer may be partially positioned at the intersections of the driving electrodes 110 and the sensing electrodes 120.

The driver 130 simultaneously supplies driving signals to at least some of the driving electrodes 110. For example, the driver 130 may select some of the driving electrodes 110 and simultaneously supply the driving signals to the selected driving electrodes. Alternatively, the driver 130 may simultaneously supply the driving signals to all of the driving electrodes 110.

The driver 130 supplies the driving signals to the driving electrodes 110 in accordance with control of the touch controller 150. For example, the driver 130 may receive a touch driving control signal TDS from the touch controller 150. The number of driving electrodes 110 to which the driving signals are simultaneously supplied may be determined by the touch driving control signal TDS.

For example, the driver 130 may simultaneously supply the driving signals to two of the first through fourth driving electrodes Tx1 through Tx4 in response to the touch driving control signal TDS. The driving signals supplied to the first through fourth driving electrodes Tx1 through Tx4 may be referred to as first through fourth driving signals TD1 through TD4, respectively.

For example, first, the driver 130 may simultaneously supply the first and second driving signals TD1 and TD2 to the first and second driving electrodes Tx1 and Tx2, respectively. Then, the third and fourth driving signals TD3 and TD4 are simultaneously supplied to the third and fourth driving electrodes Tx3 and Tx4, respectively.

Alternatively, the driver 130 may simultaneously supply the first through fourth driving signals TD1 through TD4 to the first through fourth driving electrodes Tx1 through Tx4, respectively, in response to the touch driving control signal TDS.

The sensing unit 140 detects sensing signals from the sensing electrodes 120. Here, the sensing signals may have uniform waveforms in accordance with capacitance formed between the driving electrodes 110 and the sensing electrodes 120. When a touch event is generated at a particular position, changes in the sensing signals are generated in accordance with a change in the capacitance at the particular position, and the sensing unit 140 may sense the changes in the sensing signals.

For example, the sensing unit 140 may sense first through fourth sensing signals TS1 through TS4 from the first through fourth sensing electrodes Rx1 through Rx4, respectively. The first sensing electrode Rx1 outputs the first sensing signal TS1, the second sensing electrode Rx2 outputs the second sensing signal TS2, the third sensing electrode Rx3 outputs the third sensing signal TS3, and the fourth sensing electrode Rx4 outputs the fourth sensing signal TS4.

In addition, each of the sensing signals may have a value corresponding to the sum of the simultaneously supplied driving signals. For example, when the first and second driving signals TD1 and TD2 are simultaneously supplied to the first and second driving electrodes Tx1 and Tx2, respectively, each of the first through fourth sensing signals TS1 through TS4 has a value corresponding to the sum of the first and second driving signals TD1 and TD2.

The touch controller 150 may detect a touch event by using the sensing signals. For example, the touch controller 150 may calculate an amount of change of capacitance between the driving electrodes 110 and the sensing electrodes 120 by using the sensing signals, and may calculate a position in which the touch event is generated by using the calculated amount of change of the capacitance.

The touch controller 150 may control the driver 130 so that the number of driving electrodes 110 to which the driving signals are supplied in a first driving period and the number of driving electrodes 110 to which the driving signals are supplied in a second period are different from each other.

Here, the number of driving electrodes 110 to which the driving signals are supplied in the first driving period may be set to be larger than the number of driving electrodes 110 to which the driving signals are supplied in the second period. The first driving period and the second driving period do not overlap and may be determined by a specific condition. The specific condition may be, for example, magnitudes of noises included in the sensing signals or presence of noise patterns displayed by a display unit.

According to an exemplary embodiment of the inventive concept, the touch controller 150 determines the magnitudes of the noises from the sensing signals and may control the driver 130 so that the number of driving electrodes 110 to which the driving signals are supplied vary in accordance with the determined magnitudes of the noises. For this purpose, the touch controller 150 may include a noise determiner 155 for comparing electrical characteristic values of the sensing signals with a predetermined reference range and determining the magnitudes of the noises. The touch controller 150 may control the driver 130 to increase the number of driving electrodes 110 to which the driving signals are supplied when the magnitudes of the noises are greater than or equal to a predetermined reference value.

FIG. 2 is a waveform diagram illustrating an operation of a driver according to an exemplary embodiment of the inventive concept. For convenience of description, FIG. 2 illustrates the first through fourth driving signals TD1 through TD4 supplied to the first through fourth driving electrodes Tx1 through Tx4, respectively, and the first sensing signal TS1 detected from the first sensing electrode Rx1.

Referring to FIG. 2, the driver 130 may selectively supply the first through fourth driving signals TD1 through TD4, corresponding to predetermined driving codes, to the driving electrodes 110. The driving codes may be predetermined by the touch controller 150.

According to an exemplary embodiment of the inventive concept, the driving codes may be set as A or −A. The driving codes may form one code matrix. The code matrix may be set as a Hadamard matrix having orthogonality in which all elements are 1 or −1.

For example, when the driving code is set as A, in a current driving period, the driver 130 may supply the same driving signal as a driving signal supplied in a previous period to a corresponding driving electrode. In addition, when the driving code is set as −A, in the current driving period, the driver 130 may supply a driving signal, different from the driving signal supplied in the previous period, to the corresponding driving electrode. The driving signal when the driving code is set as A and the driving signal when the driving code is set as −A may have an inverse relationship.

As described above, the touch controller 150 may control the driver 130 so that the number of driving electrodes 110 to which the driving signals are supplied in the first driving period and the number of driving electrodes 110 to which the driving signals are supplied in the second driving period are different from each other.

According to an exemplary embodiment of the inventive concept, the first driving period may be set as a normal driving period tn in which the magnitudes of the noises are smaller than the reference value and the second driving period may be set as an adaptive driving period ta in which the magnitudes of the noises are greater than or equal to the reference value.

The touch controller 150 may control the driver 130 so that the number of driving electrodes 110 to which the driving signals are supplied is reduced in the normal driving period tn and the number of driving electrodes 110 to which the driving signals are supplied is increased in the adaptive driving period ta.

For example, as illustrated in FIG. 2, in the normal driving period tn, the driver 130 may simultaneously supply the driving signals to two of the driving electrodes 110. The normal driving period tn may include a first normal driving period tn1, a second normal driving period tn2, a third normal driving period tn3, and a fourth normal driving period tn4. In the normal driving period tn, the first through fourth normal driving periods tn1 through tn4 may be periodically repeated a plurality of times.

Since two of the driving electrodes 110 are simultaneously driven at a time in the normal driving period tn, in the first normal driving period tn1 and the second normal driving period tn2, the first driving electrode Tx1 and the second driving electrode Tx2 are simultaneously driven and the third driving electrode Tx3 and the fourth driving electrode Tx4 are not driven. In the third normal driving period tn3 and the fourth normal driving period tn4, the third driving electrode Tx3 and the fourth driving electrode Tx4 are simultaneously driven and the first driving electrode Tx1 and the second driving electrode Tx2 are not driven.

In the first normal driving period tn1, the driving codes of the first driving signal TD1 and the second driving signal TD2 are set as A. At this time, the first sensing signal TS1 has a value corresponding to the sum of the first driving signal TD1 and the second driving signal TD2.

In the second normal driving period tn2, the driving code of the first driving signal TD1 is set as A and the driving code of the second driving signal TD2 is set as −A. At this time, the first sensing signal TS1 has a value corresponding to the sum of the first driving signal TD1 and the second driving signal TD2 and thus has a smaller value than in the first normal driving period tn1.

In the third normal driving period tn3, the driving codes of the third driving signal TD3 and the fourth driving signal TD4 are set as A. At this time, the first sensing signal TS1 has a value corresponding to the sum of the third driving signal TD3 and the fourth driving signal TD4.

In the fourth normal driving period tn4, the driving code of the third driving signal TD3 is set as A and the driving code of the fourth driving signal TD4 is set as −A. At this time, the first sensing signal TS1 has a value corresponding to the sum of the third driving signal TD3 and the fourth driving signal TD4 and thus has a smaller value than in the third normal driving period tn3.

The first and second driving signals TD1 and TD2 in the first normal driving period tn1 and the third and fourth driving signals TD3 and TD4 in the third normal driving period tn3 have substantially the same waveform. The first and second driving signals TD1 and TD2 in the second normal driving period tn2 and the third and fourth driving signals TD3 and TD4 in the fourth normal driving period tn4 have substantially the same waveform.

On the other hand, in the adaptive driving period ta, the driver 130 may simultaneously supply the driving signals to all of the four driving electrodes 110. The adaptive driving period ta may include a first adaptive driving period ta1, a second adaptive driving period ta2, a third adaptive driving period ta3, and a fourth adaptive driving period ta4. In the adaptive driving period ta, the first through fourth adaptive driving periods ta1 through ta4 may be periodically repeated a plurality of times. In the adaptive driving period ta, the first sensing signal TS1 has a value corresponding to the sum of the first through fourth driving signals TD1 through TD4.

In the first adaptive driving period ta1, the driving codes of the first, second, and third driving signals TD1, TD2, and TD3 are set as A and the driving code of the fourth driving signal TD4 is set as −A.

In the second adaptive driving period ta2, the driving codes of the first, second, and fourth driving signals TD1, TD2, and TD4 are set as A and the driving code of the third driving signal TD3 is set as −A.

In the third adaptive driving period ta3, the driving codes of the first, third, and fourth driving signals TD1, TD3, and TD4 are set as A and the driving code of the second driving signal TD2 is set as −A.

In the fourth adaptive driving period ta4, the driving codes of the second, third, and fourth driving signals TD2, TD3, and TD4 are set as A and the driving code of the first driving signal TD1 is set as −A.

According to an exemplary embodiment of the inventive concept, the touch controller 150 may control the driver 130 so that the normal driving period tn is set to be default and, when it is determined that the magnitudes of the noises are greater than or equal to the reference value, the driving period is set as the adaptive driving period ta. The touch controller 150 may control the driver 130 so that the driving period is set as the normal driving period tn when it is determined that the magnitudes of the noises are less than the reference value.

According to an exemplary embodiment of the inventive concept, the touch controller 150 may control the driver 130 so that the normal driving period tn is set to be default and, when it is determined that predetermined noise patterns are generated, the driving period is set as the adaptive driving period ta. The touch controller 150 may control the driver 130 so that the driving period is set as the normal driving period tn when it is determined that the predetermined noise patterns are not generated.

According to the preset exemplary embodiment, it is illustrated that two of the driving electrodes 110 are simultaneously driven in the normal driving period tn and four (e.g., all) of the driving electrodes 110 are simultaneously driven in the adaptive driving period ta. However, the inventive concept is not limited thereto, and the number of driving electrodes 110 that are simultaneously driven in the normal driving period tn and the adaptive driving period ta may vary.

Figure 3A:
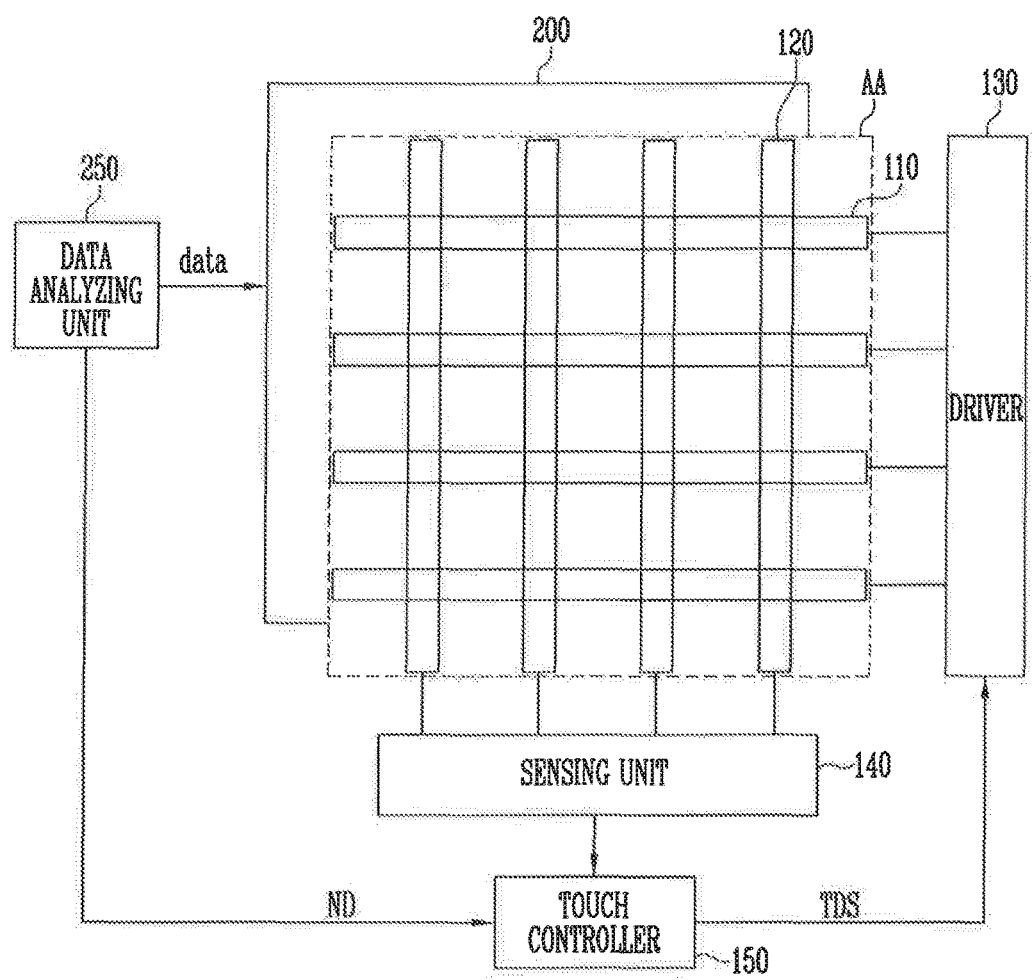
FIG. 3A is a block diagram illustrating a display device including the touch sensor of FIG. 1 according to an exemplary embodiment of the inventive concept.
Figure 3B:
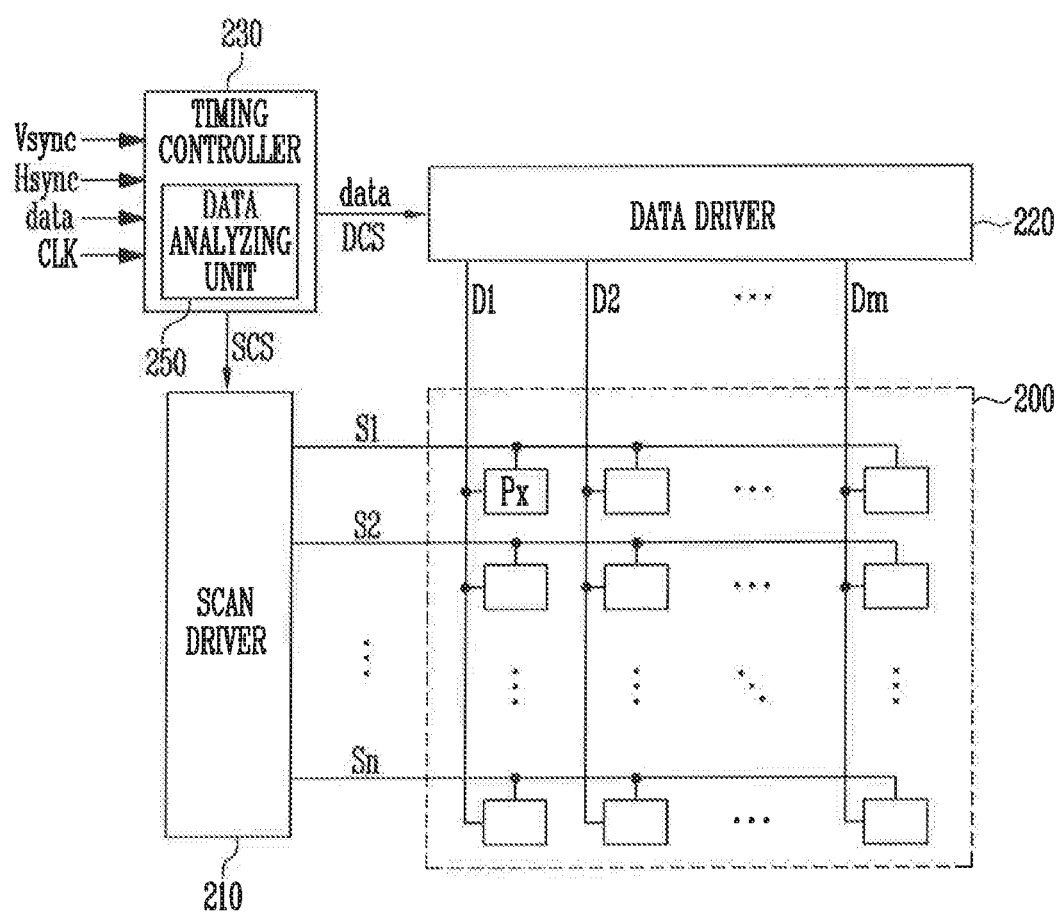
FIG. 3B is a block diagram illustrating a display unit of FIG. 3A according to an exemplary embodiment of the inventive concept.

FIG. 3A is a block diagram illustrating a display device including the touch sensor of FIG. 1 according to an exemplary embodiment of the inventive concept and FIG. 3B is a block diagram illustrating a display unit of FIG. 3A according to an exemplary embodiment of the inventive concept.

Referring to FIG. 3A, the display device according to an exemplary embodiment of the inventive concept includes the driving electrodes 110, the sensing electrodes 120, the driver 130, the sensing unit 140, the touch controller 150, a display unit 200, and a data analyzing unit 250. Descriptions of elements substantially the same as those described with reference to FIG. 1 will be omitted.

The display unit 200 displays an image based on image data. The display unit 200 may be a liquid crystal display panel or an organic light emitting display panel. The display unit 200 may include a driving circuit for displaying an image, which will be described in detail later.

The driving electrodes 110 and the sensing electrodes 120 are arranged in an active area AA that overlaps the display unit 200. The driving electrodes 110 and the sensing electrodes 120 may be manufactured in the form of a film and may be attached onto an upper substrate of the display unit 200. According to an exemplary embodiment of the inventive concept, the driving electrodes 110 and the sensing electrodes 120 may be formed in the display unit 200 by an in-cell method.

The data analyzing unit 250 analyzes the image data supplied to the display unit 200 and determines noise patterns. For example, the display unit 200 displays an image based on a voltage corresponding to the image data. As a change in voltage increases, an influence on a touch sensor (e.g., coupling noise) increases. Therefore, the data analyzing unit 250 compares specific image data in units of horizontal lines before the image data is supplied to the display unit 200 and, when the result is greater than or equal to a reference difference value, determines the specific image data as the noise patterns.

The data analyzing unit 250 generates noise information ND on the noise patterns and supplies the generated noise information ND to the touch controller 150. The touch controller 150 determines presence of the noise patterns from the noise information ND and may control the driver 130 so that the number of driving electrodes 110 to which the driving signals are supplied varies in accordance with the presence of the noise patterns.

According to an exemplary embodiment of the inventive concept, the touch controller 150 may control the driver 130 so that the normal driving period tn is set to be default and, when it is determined that the predetermined noise patterns are generated, the driving period is set as the adaptive driving period ta. The touch controller 150 may control the driver 130 so that the driving period is set as the normal driving period tn when it is determined that the predetermined noise patterns are not generated. Operation of the driver 130 in the normal driving period tn and the adaptive driving period ta may be substantially the same as described above with reference to FIG. 2.

Referring to FIG. 3B, the display device according to an exemplary embodiment of the inventive concept may further include a scan driver 210, a data driver 220, and a timing controller 230. Here, the timing controller 230 may include the data analyzing unit 250. In addition, the display unit 200 includes pixels Px driven by scan lines S through Sn and data lines D1 through Dm.

The pixels Px are selected in units of horizontal lines in response to a scan signal supplied to one of the scan lines S1 through Sn. At this time, each of the pixels Px selected by the scan signal receives a data signal from a data line (one of the data lines D1 through Dm) connected thereto. The pixels Px that receive the data signals generate light with a predetermined brightness in response to the data signals.

The scan driver 210 is connected to the scan lines Si through Sn, generates scan signals in response to a scan control signal SCS of the timing controller 230, and outputs the generated scan signals to the scan lines Si through Sn. According to an exemplary embodiment of the inventive concept, the scan driver 210 may be formed of a plurality of stage circuits and may sequentially supply the scan signals to the scan lines Si through Sn.

The data driver 220 is connected to the data lines D1 through Dm, generates data signals in response to a data control signal DCS of the timing controller 230, and outputs the generated data signals to the data lines D1 through Dm. At this time, the data driver 220 converts digital image data provided by the timing controller 230 into analog data signals (or voltages). The data driver 140 supplies the data signals to the data lines D1 through Dm in synchronization with the scan signals.

The timing controller 230 receives image data as well as synchronizing signals Vsync and Hsync and a clock signal CLK for controlling display of the image. The timing controller 230 corrects the image data to be suitable for image display by the display unit 200 and outputs the corrected image data to the data driver 220. In addition, the timing controller 230 may generate the scan control signal SCS and the data control signal DCS for controlling driving of the scan driver 210 and the data driver 220, respectively, based on the synchronizing signals Vsync and Hsync and the clock signal CLK.

As described above, according to exemplary embodiments of the inventive concept, it is possible to reduce the number of driving electrodes simultaneously driven in a normal state and to reduce total power consumption by controlling the number of driving electrodes, to which the driving signals are supplied, to be different in the first driving period as compared to the second driving period.

While the inventive concept has been shown and described with reference to exemplary embodiments thereof, it will be understood by those of ordinary skill in the art that various changes in form and details may be made thereto without departing from the spirit and scope of the inventive concept as set forth in the following claims.

What is claimed is:
1. A touch sensor comprising:
a plurality of driving electrodes;
a plurality of sensing electrodes that intersect the plurality of driving electrodes;
a driver configured to substantially simultaneously supply driving signals to at least some of the plurality of driving electrodes;
a sensing unit configured to detect sensing signals from the plurality of sensing electrodes; and
a touch controller configured to control the driver so that the number of driving electrodes to which the driving signals are supplied in a first driving period is different from the number of driving electrodes to which the driving signals are supplied in a second driving period, wherein the number of driving electrodes to which the driving signals are supplied in the second driving period is larger than the number of driving electrodes to which the driving signals are supplied in the first driving period, wherein the touch controller determines magnitudes of noises from the sensing signals and controls the driver so that the number of driving electrodes to which the driving signals are supplied varies in accordance with the determined magnitudes of the noises, and wherein, when the magnitudes of the noises are greater than or equal to a predetermined reference value, the touch controller increases the number of driving electrodes to which the driving signals are supplied.

2. The touch sensor of claim 1, wherein the first driving period is a normal driving period in which the magnitudes of the noises are smaller than the predetermined reference value and the second driving period is an adaptive driving period in which the magnitudes of the noises are greater than or equal to the predetermined reference value.

3. The touch sensor of claim 2, wherein the touch controller comprises a noise determiner configured to compare electrical characteristic values of the sensing signals with a predetermined reference range and to determine the magnitudes of the noises.

4. The touch sensor of claim 1, wherein the driver selectively supplies the driving signals, corresponding to predetermined driving codes, to the driving electrodes.

5. The touch sensor of claim 4, wherein the predetermined driving codes are predetermined by the touch controller.

6. The touch sensor of claim 1, wherein the plurality of driving electrodes and the plurality of sensing electrodes are formed of a transparent conductive material.

7. A display device comprising:
a display unit configured to display an image using image data; and
a touch sensor that overlaps the display unit,
wherein the touch sensor comprises:
a plurality of driving electrodes;
a plurality of sensing electrodes that intersect the plurality of driving electrodes;
a driver configured to substantially simultaneously supply driving signals to at least some of the plurality of driving electrodes;
a sensing unit configured to detect sensing signals from the plurality of sensing electrodes;
a touch controller configured to control the driver so that the number of driving electrodes to which the driving signals are supplied in a first driving period is different from the number of driving electrodes to which the driving signals are supplied in a second driving period; and
a data analyzing unit configured to analyze the image data and to determine noise patterns,
wherein the touch controller controls the driver so that the number of driving electrodes to which the driving signals are supplied varies in accordance with presence of the noise patterns, and
wherein the data analyzing unit compares the image data in units of horizontal lines and determines the image data as the noise patterns when a comparison result is greater than or equal to a reference difference value.

8. The display device of claim 7, wherein the first driving period is a normal driving period in which the noise patterns are not determined and the second driving period is an adaptive driving period in which the noise patterns are determined.

9. The display device of claim 7, wherein the display unit comprises a plurality of pixels connected to scan lines and data lines, and the display device further comprises:
a scan driver configured to supply scan signals through the scan lines;
a data driver configured to supply data signals through the data lines; and
a timing controller configured to control the scan driver and the data driver.

10. A method of operating a touch sensor comprising a plurality of driving electrodes and a plurality of sensing electrodes that intersect the plurality of driving electrodes, the method comprising:
detecting sensing signals from the plurality of sensing electrodes;
determining magnitudes of noises from the sensing signals;
determining whether the magnitudes of noises is less than a predetermined reference value;
determining a select number of the plurality of driving electrodes to supply driving signals in response to determining whether the magnitude of noises is less than the predetermined reference value; and
supplying the driving signals to the select number of the plurality of driving electrodes at substantially the same time, wherein
the select number of the plurality of driving electrodes when it is determined that the magnitude of noises is less than the predetermined reference value is a first number,
the select number of the plurality of driving electrodes when it is determined that the magnitude of noises is greater than or equal to the predetermined reference value is a second number, and
the first number is less than the second number.

11. The method of claim 10, wherein
when it is determined that the magnitude of noises is less than the predetermined reference value, a current driving period is set to a normal driving period, and
when it is determined that the magnitude of noises is greater than or equal to the predetermined reference value, the current driving period is set to an adaptive driving period.

12. The method of claim 11, wherein
the normal driving period comprises first to fourth normal driving periods,
the select number of the plurality of driving electrodes is less than a total number of the plurality of driving electrodes,
the driving signals are supplied to the select number of the plurality of driving electrodes at substantially the same time during the first and second normal driving periods, and
the driving signals are supplied to a remaining number of the plurality of driving electrodes at substantially the same time during the third and fourth normal driving periods.

13. The method of claim 12, wherein
a first sensing signal among the sensing signals has a higher value in the first normal driving period than in the second normal driving period.

14. The method of claim 10, wherein each of the sensing signals has a value corresponding to a sum of the driving signals that are supplied to the select number of the plurality of driving electrodes.

* * * * *